F. M. NETZEL.
METHOD OF MAKING TIRE CASING FILLERS.
APPLICATION FILED MAR. 21, 1921.
1,397,842.
Patented Nov. 22, 1921.
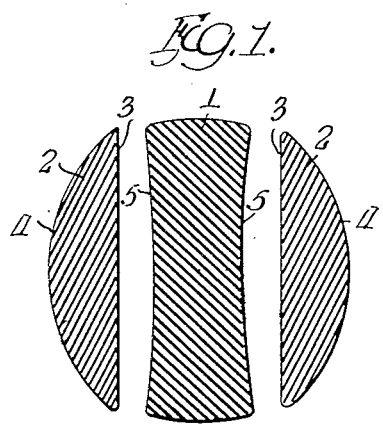
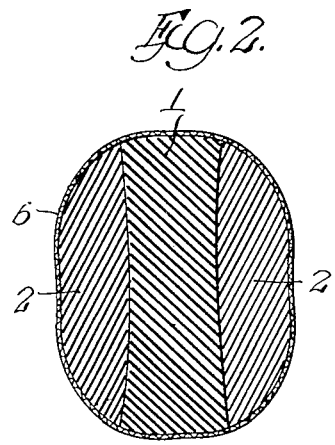
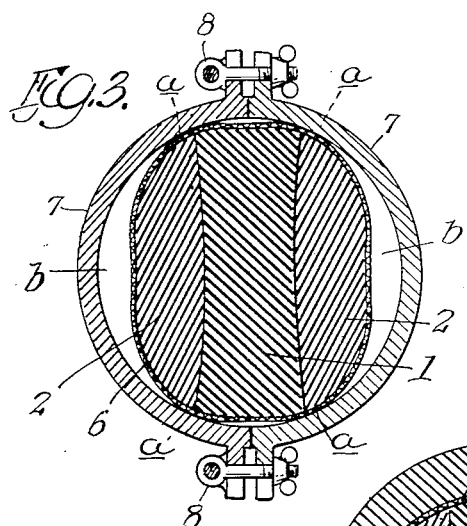
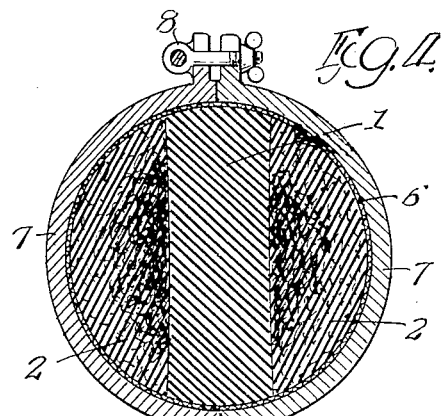
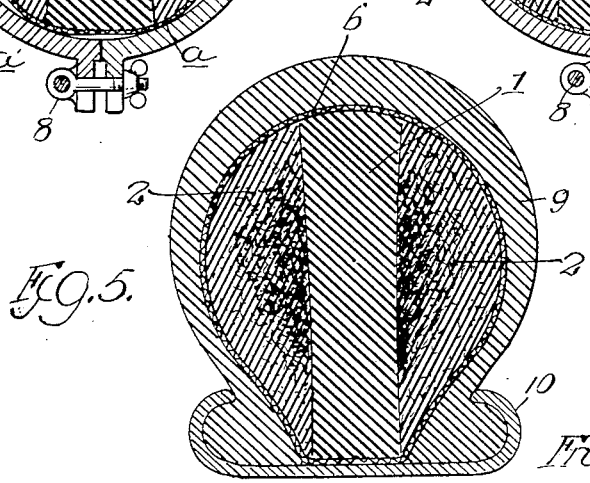
Inventor
Frank M. Netzel

UNITED STATES PATENT OFFICE.

FRANK M. NETZEL, OF CHICAGO, ILLINOIS, ASSIGNOR TO VELVET RUBBER COMPANY, OF CHICAGO, ILLINOIS, A CORPORATION OF ILLINOIS.

METHOD OF MAKING TIRE-CASING FILLERS.

1,397,842.  Specification of Letters Patent.  Patented Nov. 22, 1921.

Application filed March 21, 1921. Serial No. 453,894.

*To all whom it may concern:*

Be it known that I, FRANK M. NETZEL, a citizen of the United States, residing at Chicago, in the county of Cook and State of Illinois, have invented new and useful Improvements in Methods of Making Tire-Casing Fillers, of which the following is a specification.

This invention relates to a method of making tire casing fillers, such as are composed of strips of resilient rubber vulcanized together and incased in a fabric wrapping.

The object of the invention is to initially make all of the filler strips of solid rubber and in such manner that a space is left between the mold and the filler around the sides thereof to allow for expansion of the rubber strips, so that the two side strips may take the form of sponge rubber adjacent their connection with the center strip and thus have a resiliency greater than that of the center strip which retains its solid rubber character.

In the accompanying drawings—

Figures 1 to 4 inclusive illustrate the several steps employed in making the tire casing filler by the method of my invention; and Fig. 5 is a cross-sectional view showing the filler after being made in the outer casing or shoe of a pneumatic tire.

In carrying out the method of my invention, I first make three strips of rubber, a center strip 1 and two side strips 2, 2. These strips are initially made separate, as shown in Fig. 1, and all are made from relatively soft solid rubber of substantially the same consistency and resiliency. In making the strips, the rubber compound is prepared and after being heated is forced out through a die of a tubing machine in the shape desired, and after appropriate lengths have been run they are cut off.

The side strips 2, 2 are both alike and come out of the tubing machine in a continuous strip having the cross-sectional shape shown. Each side strip 2, as shown in Fig. 1, when initially made has a flat inside surface 3 and a convex or rounded outside surface 4 to conform more or less to the contour of the inner curvature of the tire casing or shoe in which the filler is ultimately used.

The center strip 1 is also made by a tubing machine by being run out through a die having the shape desired and this, as shown in Figs. 1 to 3, gives the center strip two concave side faces 5.

After the two strips 1, 2 have been thus made, they are placed together with the center strip between the other two, and the whole bent into annular form and wrapped or incased in a fabric wrapping or casing 6, as shown in Fig. 2. This casing or wrapping holds the strips together and also in annular form, and it will be observed that the side strips 2, 2 sink into and fill the cavities formed by the concave side faces 5 of the center strip, so that the side strips contact throughout with the center strip. This causes the outer curved surfaces 4 of the side strips to take somewhat the dished form of the concave faces 5 of the center strip, especially at points substantially midway between the top and bottom edges of the strips, as shown in Fig. 2. This naturally causes the filler when thus built up to not have a true circular shape in cross-section.

The next step in my method is to place the filler of Fig. 2 in a circular mold 7, as shown in Fig. 3. This mold is made in two half sections, as shown, which are clamped together by suitable bolts 8, 8, as shown, and when the filler of Fig. 2 is placed in the mold, the filler not being circular in cross-section will have the mold impinge against it at points substantially along the portions *a* of each side strip 2, and compress somewhat such portions of the rubber. This also leaves a space *b* between the mold and each side strip 2, as shown in Fig. 3.

The next step is to vulcanize the center and side strips together while in the mold and in the vulcanizing process the filler, 7, and in the vulcanizing process the filler, when in the form shown in Fig. 3, expands, the expansion being permitted by the spaces *b* at opposite sides thereof, and these spaces permit the side strips 2 when expanding to be made like sponge rubber, especially throughout the center thereof and along the line of juncture with the center strip 1, as shown in Fig. 4. By allowing the side strips 2 to expand, they are given a degree of resiliency greater than that of the center strip 1 so that the latter may be made relatively stiff enough to support, so to speak, the normal load of the weight on the tire because when the filler is placed in the outer shoe or casing 8, as shown in Fig. 5, the center strip extends between the metal rim 10 and the portion of the tire casing thereabove so as to extend radially with respect to the wheel and serve to support the normal load on the tire.

The side strips 2 on expanding soon come into contact with the mold 7, and prevent the center strip 1 from expanding to such an extent that it loses its solid rubber character. Moreover, the center strip becomes relatively harder than the side strips, not only to be stiff enough to materially aid in supporting the normal load on the tire, but also to assist effectively in keeping the casing 9 distended vertically and thus keeping its clencher beads in the channels of the rim 10.

I claim as my invention:

1. The method of making a tire casing filler, composed of a center strip of relatively hard solid rubber and two side strips of more resilient rubber, consisting in, first, making the strips separate, from relatively soft solid rubber and of a shape making the sides of the filler somewhat dished, when the strips are placed together, second, placing the strips together, third, bending the strips while together into annular form and incasing the same in a fabric wrapping, and, fourth, placing the filler in a mold to provide spaces between the sides of the filler and the mold to allow the side strips to expand when the strips are vulcanized together.

2. The method of making a tire casing filler, composed of a center strip of relatively hard solid rubber and two side strips of more resilient rubber, consisting in, first, making the strips separate, from relatively soft solid rubber and of a shape with the inner faces of the side strips substantially flat and the side faces of the center strip concave, second, placing the strips together to cause the side strips to sink into the concave sides of the center strip, third, bending the strips, while together, into annular form and incasing the same in a fabric wrapping, and, fourth, placing the filler in a circular mold to provide spaces between the sides of the filler and the mold to allow the side strips to expand when the strips are vulcanized together.

3. The method of making a tire casing filler, composed of strips of rubber of different resiliencies, consisting in, first, making the strips separate, from relatively soft solid rubber and of a shape permitting the side strips to expand when placed together in a mold, second, placing the strips together, bending into annular form and incasing in a fabric wrapping, and, third, placing the filler in a mold of such shape to allow the side strips to expand when the strips are vulcanized together.

In testimony that I claim the foregoing as my invention, I affix my signature, this 18th day of March, A. D. 1921.

FRANK M. NETZEL.